US010364098B2

(12) United States Patent
Lindbo et al.

(10) Patent No.: US 10,364,098 B2
(45) Date of Patent: Jul. 30, 2019

(54) ROBOTIC PICKING SYSTEM DEVICE AND METHOD

(71) Applicant: Ocado Innovation Limited, Hertfordshire (GB)

(72) Inventors: Lars Sverker Ture Lindbo, Hertfordshire (GB); Andrew John Ingram-Tedd, Hertfordshire (GB)

(73) Assignee: OCADO INNOVATION LIMITED, Hatfield, Hertfordshire (GB)

( * ) Notice: Subject to any disclaimer, the term of this patent is extended or adjusted under 35 U.S.C. 154(b) by 0 days.

(21) Appl. No.: 15/555,921

(22) PCT Filed: Apr. 15, 2016

(86) PCT No.: PCT/EP2016/058385
§ 371 (c)(1),
(2) Date: Sep. 5, 2017

(87) PCT Pub. No.: WO2016/166312
PCT Pub. Date: Oct. 20, 2016

(65) Prior Publication Data
US 2018/0037411 A1    Feb. 8, 2018

(30) Foreign Application Priority Data

Apr. 15, 2015 (GB) .................................. 1506365.4
Aug. 13, 2015 (GB) .................................. 1514428.0
(Continued)

(51) Int. Cl.
*G06F 7/00* (2006.01)
*B65G 1/04* (2006.01)
(Continued)

(52) U.S. Cl.
CPC ........... *B65G 1/0464* (2013.01); *A01G 9/022* (2013.01); *A01G 9/16* (2013.01); *A01G 31/06* (2013.01);
(Continued)

(58) Field of Classification Search
None
See application file for complete search history.

(56) References Cited

U.S. PATENT DOCUMENTS 2,701,065 A    2/1955  Bertel
3,507,406 A *  4/1970  Zollinger ............. B65G 1/0485
                                                   198/436
(Continued)

FOREIGN PATENT DOCUMENTS

DE    2719953 A    7/1978
DE    4439740 C1   5/1996
(Continued)

OTHER PUBLICATIONS

International Search Report (PCT/ISA/210) dated Jul. 15, 2016, by the European Patent Office as the International Searching Authority for International Application No. PCT/EP2016/058467.
(Continued)

*Primary Examiner* — Yolanda R Cumbess
(74) *Attorney, Agent, or Firm* — Buchanan Ingersoll & Rooney PC

(57) ABSTRACT

A bin is described for use on a robotic picking system grid. The bin is capable of removing liquids from beneath a robotic picking system following spillages or sprinkler deployments.

17 Claims, 7 Drawing Sheets

(30) Foreign Application Priority Data

| Oct. 13, 2015 | (GB) | ................................ | 1518089.6 |
| Oct. 13, 2015 | (GB) | ................................ | 1518091.2 |
| Oct. 13, 2015 | (GB) | ................................ | 1518094.6 |
| Oct. 13, 2015 | (GB) | ................................ | 1518111.8 |
| Oct. 13, 2015 | (GB) | ................................ | 1518115.9 |
| Oct. 13, 2015 | (GB) | ................................ | 1518117.5 |
| Feb. 9, 2016 | (GB) | ................................ | 1602332.7 |
| Feb. 25, 2016 | (GB) | ................................ | 1603328.4 |

(51) Int. Cl.

| *A01G 9/16* | (2006.01) |
| *A01G 31/06* | (2006.01) |
| *B62D 33/02* | (2006.01) |
| *B65G 63/00* | (2006.01) |
| *B65G 67/02* | (2006.01) |
| *E04B 1/348* | (2006.01) |
| *B65G 1/06* | (2006.01) |
| *B65G 57/03* | (2006.01) |
| *E06B 9/68* | (2006.01) |
| *A01G 9/02* | (2018.01) |
| *A47L 7/00* | (2006.01) |
| *B65G 1/137* | (2006.01) |
| *B65D 21/02* | (2006.01) |
| *A01G 9/18* | (2006.01) |

(52) U.S. Cl.
CPC ............ *A47L 7/0047* (2013.01); *B62D 33/02* (2013.01); *B62D 33/0207* (2013.01); *B65D 21/0212* (2013.01); *B65G 1/0478* (2013.01); *B65G 1/065* (2013.01); *B65G 1/137* (2013.01); *B65G 57/03* (2013.01); *B65G 63/004* (2013.01); *B65G 67/02* (2013.01); *E04B 1/34807* (2013.01); *E06B 9/68* (2013.01); *A01G 9/18* (2013.01); *B65G 1/0407* (2013.01); *B65G 2207/22* (2013.01); *B65G 2207/40* (2013.01); *E06B 2009/6818* (2013.01); *Y02A 40/254* (2018.01); *Y02P 60/148* (2015.11); *Y02P 60/216* (2015.11); *Y10S 901/01* (2013.01)

(56) References Cited

U.S. PATENT DOCUMENTS

| 3,744,193 | A | | 7/1973 | Lau |
| 4,088,232 | A | | 5/1978 | Lilly |
| 4,561,554 | A | | 12/1985 | Swincicki |
| 4,599,829 | A | | 7/1986 | DiMartino, Sr. |
| 4,723,381 | A | | 2/1988 | Straumsnes |
| 4,917,429 | A | | 4/1990 | Giger |
| 4,973,219 | A | | 11/1990 | Brickner et al. |
| 6,152,287 | A | | 11/2000 | Luria |
| 6,654,662 | B1 | * | 11/2003 | Hognaland .......... B65G 1/0464 700/214 |
| 8,408,863 | B1 | | 4/2013 | Benedict et al. |
| 8,628,289 | B1 | | 1/2014 | Benedict et al. |
| 2002/0057956 | A1 | | 5/2002 | Jephcott |
| 2003/0005626 | A1 | | 1/2003 | Yoneda et al. |
| 2003/0141973 | A1 | | 7/2003 | Yeh et al. |
| 2003/0156501 | A1 | | 8/2003 | Spindel et al. |
| 2004/0016624 | A1 | | 1/2004 | Jephcott |
| 2005/0220573 | A1 | | 10/2005 | Benedict et al. |
| 2006/0201377 | A1 | | 9/2006 | Gielow |
| 2007/0016328 | A1 | | 1/2007 | Ziegler et al. |
| 2008/0075566 | A1 | | 3/2008 | Benedict et al. |
| 2008/0075568 | A1 | | 3/2008 | Benedict et al. |
| 2008/0075569 | A1 | | 3/2008 | Benedict et al. |
| 2008/0134458 | A1 | | 6/2008 | Ziegler et al. |
| 2008/0140255 | A1 | | 6/2008 | Ziegler et al. |
| 2008/0155768 | A1 | | 7/2008 | Ziegler et al. |
| 2008/0213073 | A1 | | 9/2008 | Benedict et al. |
| 2010/0125968 | A1 | * | 5/2010 | Ho ............................ A47L 5/00 15/319 |
| 2010/0213086 | A1 | * | 8/2010 | Emond .............. G06K 7/10178 206/232 |
| 2010/0275512 | A1 | | 11/2010 | Nien |
| 2011/0027059 | A1 | | 2/2011 | Benedict et al. |
| 2011/0192082 | A1 | | 8/2011 | Uchiyama |
| 2011/0271469 | A1 | | 11/2011 | Ziegler et al. |
| 2012/0036659 | A1 | | 2/2012 | Ziegler et al. |
| 2012/0147558 | A1 | | 6/2012 | Dunn, Jr. et al. |
| 2012/0272500 | A1 | | 11/2012 | Camenisch et al. |
| 2013/0011226 | A1 | | 1/2013 | Camenisch et al. |
| 2014/0026474 | A1 | | 1/2014 | Kulas |
| 2014/0069007 | A1 | | 3/2014 | Chen et al. |
| 2014/0191633 | A1 | | 7/2014 | Zhu et al. |
| 2014/0283452 | A1 | | 9/2014 | Dittman |
| 2014/0289992 | A1 | | 10/2014 | Ziegler et al. |
| 2015/0045944 | A1 | | 2/2015 | Visser et al. |
| 2015/0127143 | A1 | | 5/2015 | Lindbo et al. |
| 2016/0095309 | A1 | | 4/2016 | Camenisch et al. |
| 2016/0129587 | A1 | | 5/2016 | Lindbo et al. |
| 2016/0140488 | A1 | | 5/2016 | Lindbo |

FOREIGN PATENT DOCUMENTS

| DE | 10 2011 103443 A1 | 12/2012 |
| DE | 10 2012 025154 A1 | 6/2014 |
| EP | 0 767 113 B1 | 7/2002 |
| EP | 1037828 B1 | 9/2003 |
| EP | 2 133 289 A1 | 12/2009 |
| EP | 2 308 283 A1 | 4/2011 |
| EP | 2 783 913 A2 | 10/2014 |
| EP | 2 829 210 A2 | 1/2015 |
| GB | 1157145 A | 7/1969 |
| GB | 2514930 A | 12/2014 |
| GB | 2518259 A | 3/2015 |
| GB | 2520104 A | 5/2015 |
| GB | 2527543 A | 12/2015 |
| GB | 2528573 A | 1/2016 |
| GB | 2529029 A | 2/2016 |
| GB | 2529527 A | 2/2016 |
| JP | 09-299496 A | 11/1997 |
| JP | 2000-255786 A | 9/2000 |
| LU | 88 754 A1 | 10/1996 |
| NO | 317366 B1 | 10/2004 |
| WO | WO 92/04713 A1 | 3/1992 |
| WO | WO 97/38928 A1 | 10/1997 |
| WO | WO 98/49075 A1 | 11/1998 |
| WO | WO 03/031285 A1 | 4/2003 |
| WO | WO 03/095339 A1 | 11/2003 |
| WO | WO 2004/096609 A1 | 11/2004 |
| WO | WO 2008/108845 A2 | 9/2008 |
| WO | WO 2011/047710 A1 | 4/2011 |
| WO | WO 2013/082601 A1 | 6/2013 |
| WO | WO 2013/147597 A1 | 10/2013 |
| WO | WO 2013/162192 A1 | 10/2013 |
| WO | WO 2013/167907 A1 | 11/2013 |
| WO | WO 2013/169110 A1 | 11/2013 |
| WO | WO 2014/195901 A1 | 12/2014 |
| WO | WO 2014/203126 A1 | 12/2014 |
| WO | WO 2015/105426 A1 | 7/2015 |

OTHER PUBLICATIONS

Written Opinion (PCT/ISA/237) dated Jul. 15, 2016, by the Japanese Patent Office as the International Searching Authority for International Application No. PCT/EP2016/058467.

International Search Report (PCT/ISA/210) dated Jul. 20, 2016, by the European Patent Office as the International Searching Authority for International Application No. PCT/EP2016/058466.

Written Opinion (PCT/ISA/237) dated Jul. 20, 2016, by the Japanese Patent Office as the International Searching Authority for International Application No. PCT/EP2016/058466.

(56) References Cited

OTHER PUBLICATIONS

International Search Report (PCT/ISA/210) dated Jul. 18, 2016, by the European Patent Office as the International Searching Authority for International Application No. PCT/EP2016/058405.
Written Opinion (PCT/ISA/237) dated Jul. 18, 2016, by the Japanese Patent Office as the International Searching Authority for International Application No. PCT/EP2016/058405.
International Search Report (PCT/ISA/210) dated Jul. 14, 2016, by the European Patent Office as the International Searching Authority for International Application No. PCT/EP2016/058385.
Written Opinion (PCT/ISA/237) dated Jul. 14, 2016, by the Japanese Patent Office as the International Searching Authority for International Application No. PCT/EP2016/058385.
International Search Report (PCT/ISA/210) dated Jul. 19, 2016, by the European Patent Office as the International Searching Authority for International Application No. PCT/EP2016/058384.
Written Opinion (PCT/ISA/237) dated Jul. 19, 2016, by the Japanese Patent Office as the International Searching Authority for International Application No. PCT/EP2016/058384.
International Search Report (PCT/ISA/210) dated Jul. 18, 2016, by the European Patent Office as the International Searching Authority for International Application No. PCT/EP2016/058381.
Written Opinion (PCT/ISA/237) dated Jul. 18, 2016, by the Japanese Patent Office as the International Searching Authority for International Application No. PCT/EP2016/058381.
International Search Report (PCT/ISA/210) dated Aug. 30, 2016, by the European Patent Office as the International Searching Authority for International Application No. PCT/EP2016/058366.
Written Opinion (PCT/ISA/237) dated Aug. 30, 2016, by the Japanese Patent Office as the International Searching Authority for International Application No. PCT/EP2016/058366.
International Search Report (PCT/ISA/210) dated Jul. 14, 2016, by the European Patent Office as the International Searching Authority for International Application No. PCT/EP2016/058407.
Written Opinion (PCT/ISA/237) dated Jul. 14, 2016, by the Japanese Patent Office as the International Searching Authority for International Application No. PCT/EP2016/058407.
Search Report dated Dec. 22, 2016, by the European Patent Office for Application No. 1606679.7.
Search Report dated Dec. 21, 2016, by the European Patent Office for Application No. 1606677.1.
Search Report dated Mar. 8, 2016, by the European Patent Office for Application No. 1518089.6.
The first application names Lars Sverker Ture Lindbo; Andrew John Ingram-Tedd; Pawel Karolinczak; and Matthew Whelan as inventors, is entitled "Robotic Container Handling Device and Method".
The first application names Lars Sverker Ture Lindbo; Paul Clarke; Andrew John Ingram-Tedd; and Pawel Karolinczak as inventors, is entitled "Storage System and Methods".
The second application names Paul Clarke; Lars Sverker Ture Lindbo; Andrew John Ingram-Tedd; and Pawel Karolinczak as inventors, is entitled "Storage System and Methods".
The second application names Paul Clarke; Lars Sverker Ture Lindbo; Andrew John Ingram-Tedd; James, Waddilove and Jonty Angel as inventors, is entitled "System and Method for Configuration of Buildings or Storage".
The fourth appiication names Paul Clarke; Lars Sverker Ture Lindbo; and Andrew John Ingram-Tedd as inventors, is entitled "Storage System With Partition Means and Methods".
The sixth application names Lars Sverker Ture Lindbo; and Andrew John Ingram-Tedd as inventors, is entitled "Object Handling System and Method".
The seventh application names Lars Sverker Ture Lindbo; Paul Clarke; Andrew John Ingram-Tedd; Pawel Karolinczak; and Alexander Howard Whitaker as inventors, is entitled "Growing System and Method".

* cited by examiner

ROBOTIC PICKING SYSTEM DEVICE AND METHOD

The present invention relates to a robotic picking system device and method. More specifically but not exclusively, it relates to an automated device and method for removing liquid from under a robotic picking system following spillages, cleaning or the deployment of one or more sprinklers.

This application claims priority from UK Patent Application Nos. GB1506365.4 filed 15 Apr. 2015, GB1514428.0 filed 13 Aug. 2015, GB1518089.6 filed 13 Oct. 2015, GB1602332.7 filed 9 Feb. 2016, GB1518091.2 filed 13 Oct. 2015, GB1518094.6 filed 13 Oct. 2015, GB1518111.8 filed 13 Oct. 2015, GB1518115.9 filed 13 Oct. 2015, GB1518117.5 filed 13 Oct. 2015 and GB1603328.4 filed 25 Feb. 2016 the content of all these applications hereby being incorporated by reference.

This application is filed as part of a suite of applications all filed in the name of Ocado Innovation Limited on 13 Oct. 2015, under UK Patent Application reference numbers 000035 GB, 000036 GB, 000039 GB, 000045 GB, and 000048 GB. The content of these applications is hereby incorporated by reference.

Some commercial and industrial activities require systems that enable the storage and retrieval of a large number of different products. One known type of system for the storage and retrieval of items in multiple product lines involves arranging storage bins or containers in stacks on top of one another, the stacks being arranged in rows. The storage bins or containers are accessed from above, removing the need for aisles between the rows and allowing more containers to be stored in a given space.

Methods of handling containers stacked in rows have been well known for decades. In some such systems, for example as described in U.S. Pat. No. 2,701,065, to Bertel comprise freestanding stacks of containers arranged in rows in order to reduce the storage volume associated with storing such containers but yet still providing access to a specific container if required. Access to a given container is made possible by providing relatively complicated hoisting mechanisms which can be used to stack and remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 0 767 113 B to Cimcorp. '113 discloses a mechanism for removing a plurality of stacked containers, using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack).

In the system described in '113, the height of the tube has to be as least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler.

EP 1037828 B1 (Autostore) the contents of which are incorporated herein by reference, describes a system in which stacks of containers are arranged within a frame structure. A system of this type is illustrated schematically in FIGS. 1 to 4 of the accompanying drawings. Robotic load handling devices can be controllably moved around the stack on a system of tracks on the upper most surface of the stack.

One form of robotic load handling device is further described in Norwegian patent number 317366, the contents of which are incorporated herein by reference. FIGS. 3(a) and 3(b) are schematic perspective views of a load handling device from the rear and front, respectively, and FIG. 3(c) is a schematic front perspective view of a load handling device lifting a bin.

A further development of load handling device is described in UK Patent Application No 1314313.6 where each robotic load handler only covers one grid space, thus allowing higher density of load handlers and thus higher throughput of a given size system.

Sprinkler systems are well known in the art and are an essential safety feature in the event of fire in many commercial settings. Given the large size of known storage systems, sprinkler systems are often installed to prevent the spread of fire within the storage system. If one or more sprinkler deploys, large amounts of water are dispensed onto the stacks and accumulates on the floor under the stacks. Spillages and cleaning may also result in the accumulation of liquids on the floor under the stacks.

In the storage systems described liquids can only be removed from under the stacks by removing the bins from a large portion of the grid, and stopping all robotic load handlers on the entire grid so that personnel can safely enter the grid and manually remove the liquid using mops and buckets.

According to the invention there is provided a bin for use in a storage system comprising: a first set of parallel rails or tracks and a second set of parallel rails or tracks extending transverse to the first set in a substantially horizontal plane to form a grid pattern comprising a plurality of grid spaces; a plurality of storage containers arranged in stacks, located beneath the rails and; at least one load handling device disposed on the grid, arranged to move laterally above the stacks on the rails, the load handling device comprising a lifting device arranged to lift a single container from a stack; wherein the bin comprises absorbent means.

According to the invention there is further provided a storage system comprising a first set of parallel rails or tracks and a second set of parallel rails or tracks extending transverse to the first set in a substantially horizontal plane to form a grid pattern comprising a plurality of grid spaces; a plurality of storage containers arranged in stacks, located beneath the rails and; at least one load handling device disposed on the grid, arranged to move laterally above the stacks on the rails, the load handling device comprising a lifting device arranged to lift a single container from a stack; wherein the bin comprises vacuum cleaning means.

In a preferred aspect the bin can be stacked with conventional storage containers.

In a preferred aspect the bin is conveyed by the robotic load handling devices in the same way as a conventional bin.

In a preferred aspect the absorbent means comprises a layer which covers one or more sides of the bin.

In a preferred aspect the absorbent means are located on one or more edges of the base of the bin.

In a preferred aspect the absorbent means is a sponge.

In a preferred aspect the sponge is a super absorbent sponge.

According to the invention there is further provided a squeezing device comprising a vessel for receiving liquid; and a surface against which in use the absorbent means of a bin is compressed by the robotic load handling device to expel liquid from the absorbent means into the vessel.

According to the invention there is provided an automated method of removing liquids from beneath a robotic picking system comprising conveying a bin to the liquid to be removed, urging the absorbent means against the liquid to draw the liquid into the absorbent means.

In this way, the present invention overcomes the problems of the prior art and provides an automated system and method of rapidly removing liquids from under the grid which minimises down time.

The invention will now be described with reference to the accompanying diagrammatic drawings in which.

Figure 1:
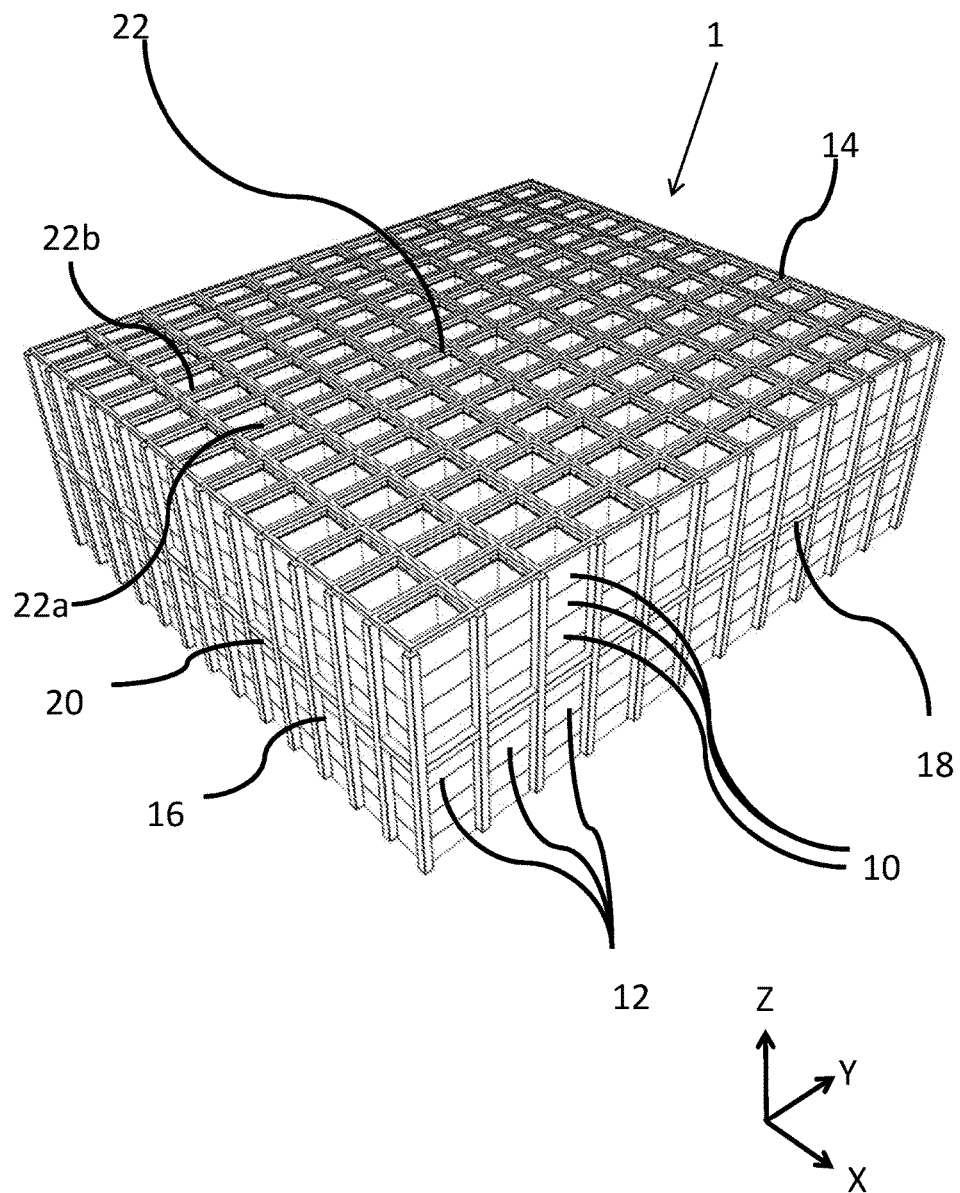
FIG. 1 is a schematic perspective view of a frame structure for housing a plurality of stacks of bins in a known storage system.
Figure 2:
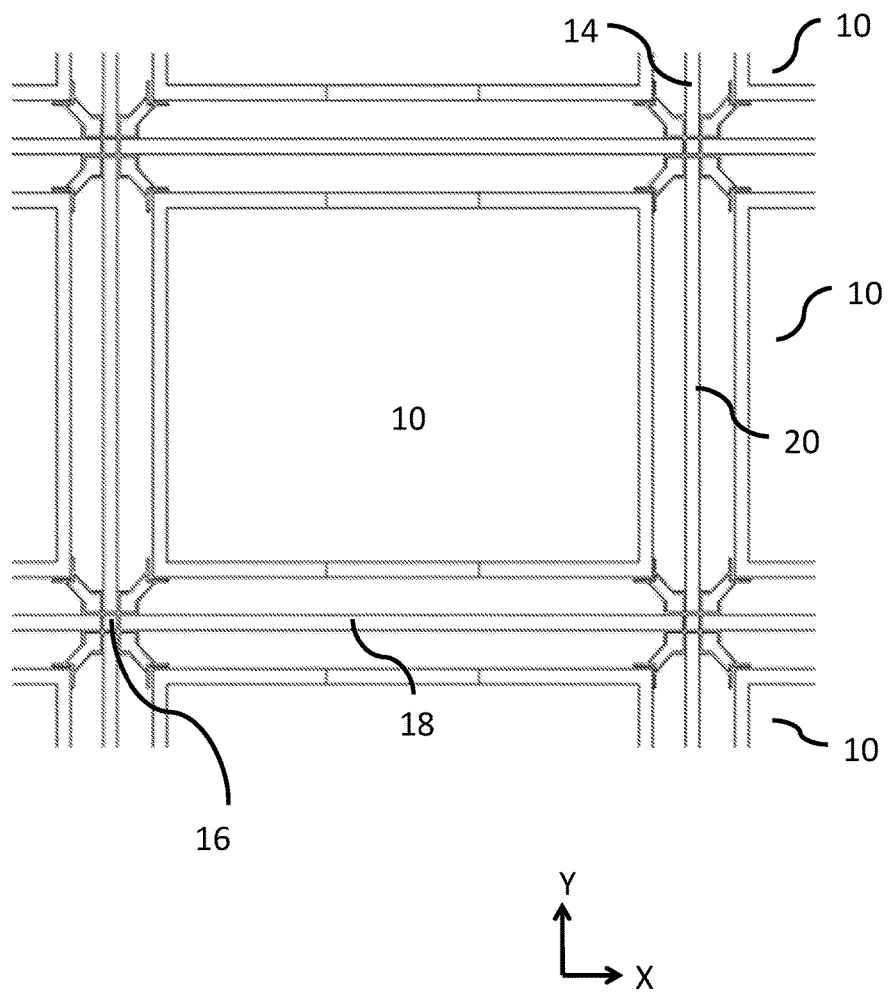
FIG. 2 is a schematic plan view of part of the frame structure of FIG. 1.
Figure 3A:
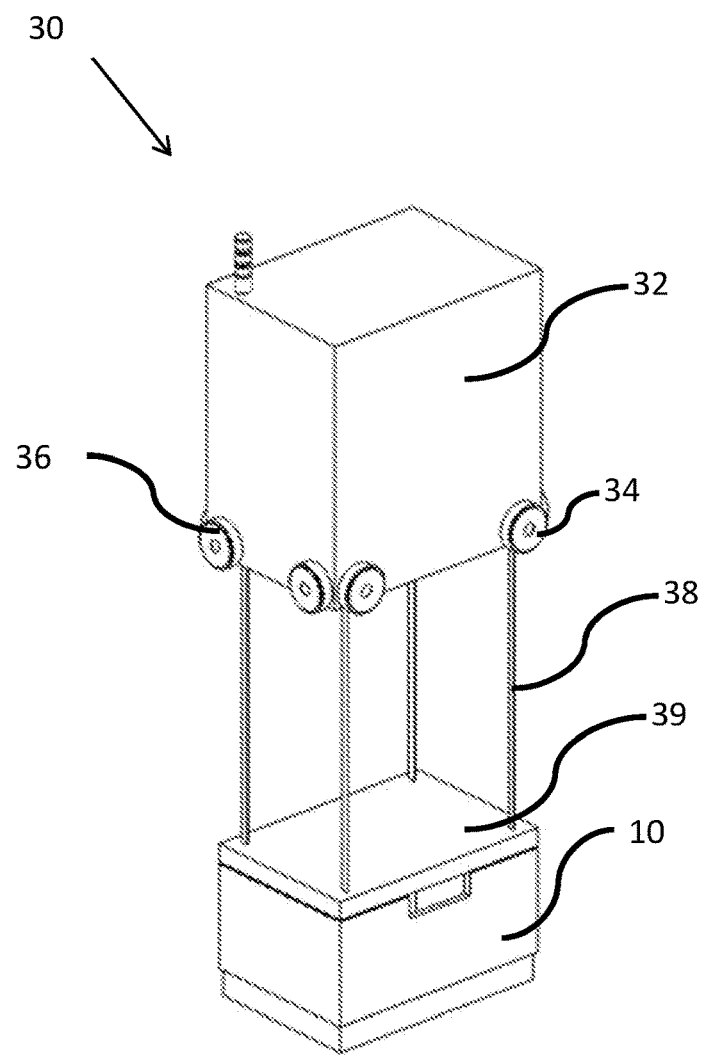
Figures 3B, 3C:
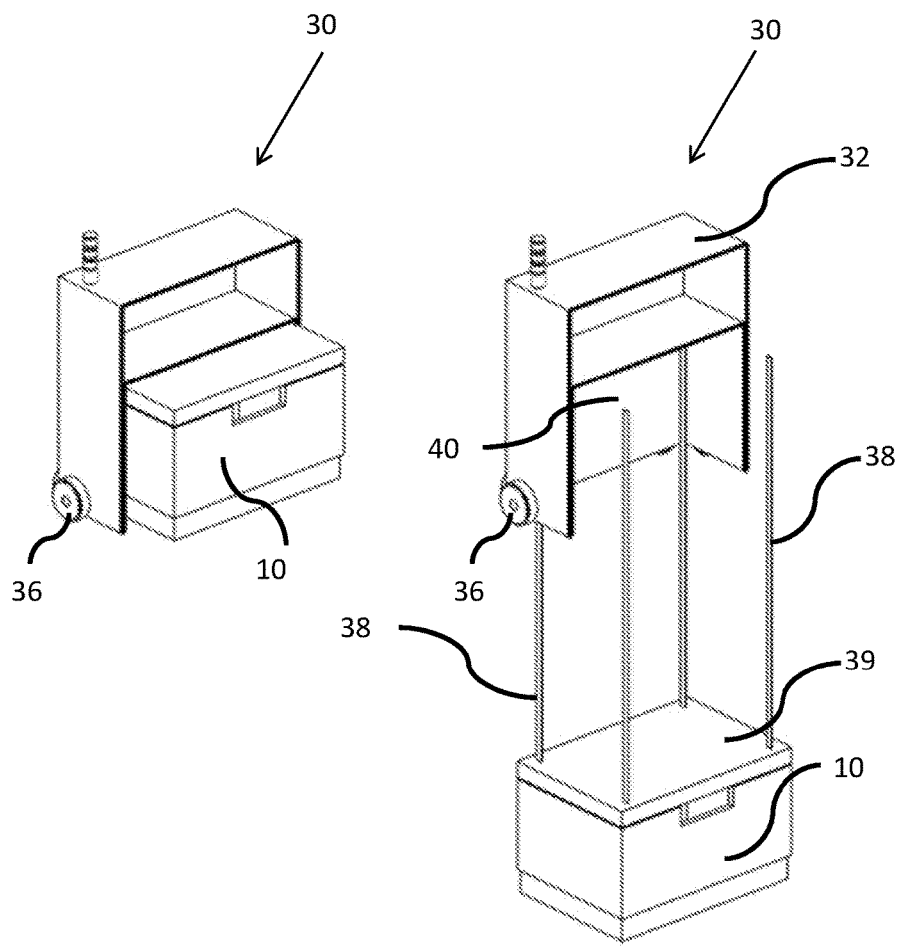
Figure 4:
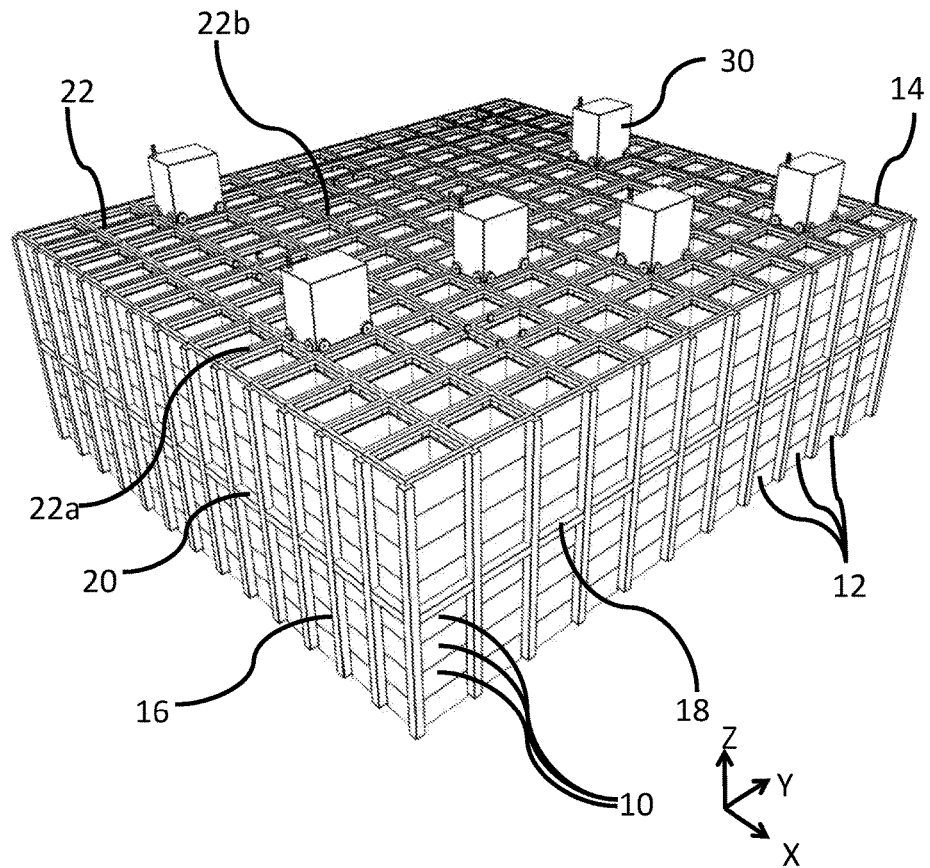
Figure 5:
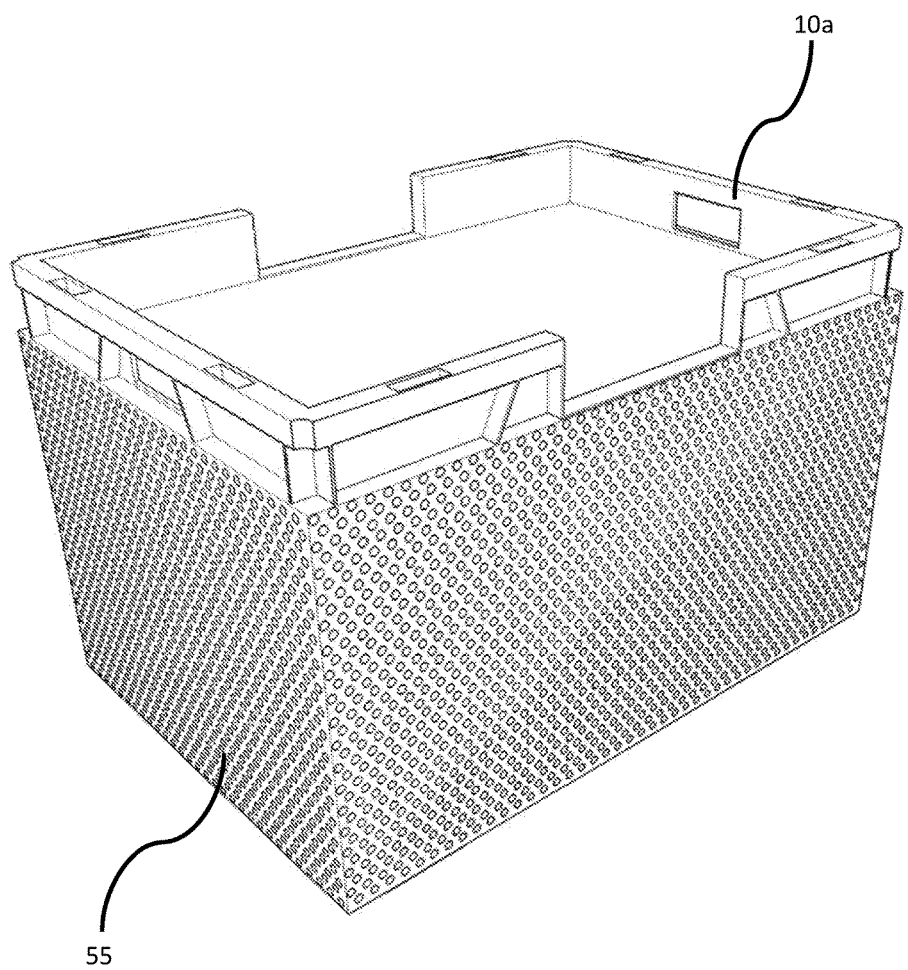
Figure 6A:
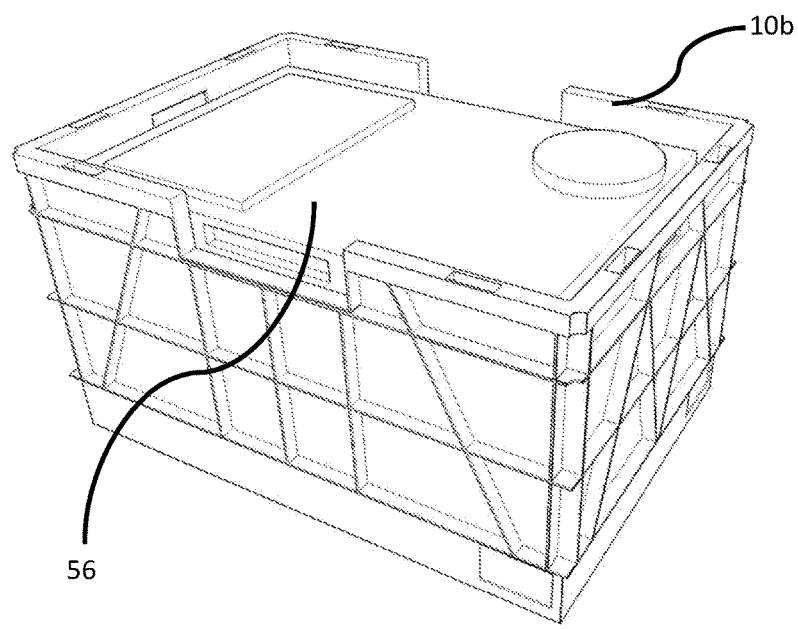

FIGS. 3(a) and 3(b) are schematic perspective views, from the rear and front respectively, of one form of robotic load handling device for use with the frame structure of FIGS. 1 and 2, and FIG. 3(c) is a schematic perspective view of the known load handler device in use lifting a bin;

FIG. 4 is a schematic perspective view of a known storage system comprising a plurality of load handler devices of the type shown in FIGS. 3(a), 3(b) and 3(c), installed on the frame structure of FIGS. 1 and 2, together with a robotic service device in accordance with one form of the invention;

FIG. 5 is a schematic perspective view of a bin having an absorbent means;

FIG. 6a is a schematic perspective view of a bin comprising vacuum means; and

Figure 6B:
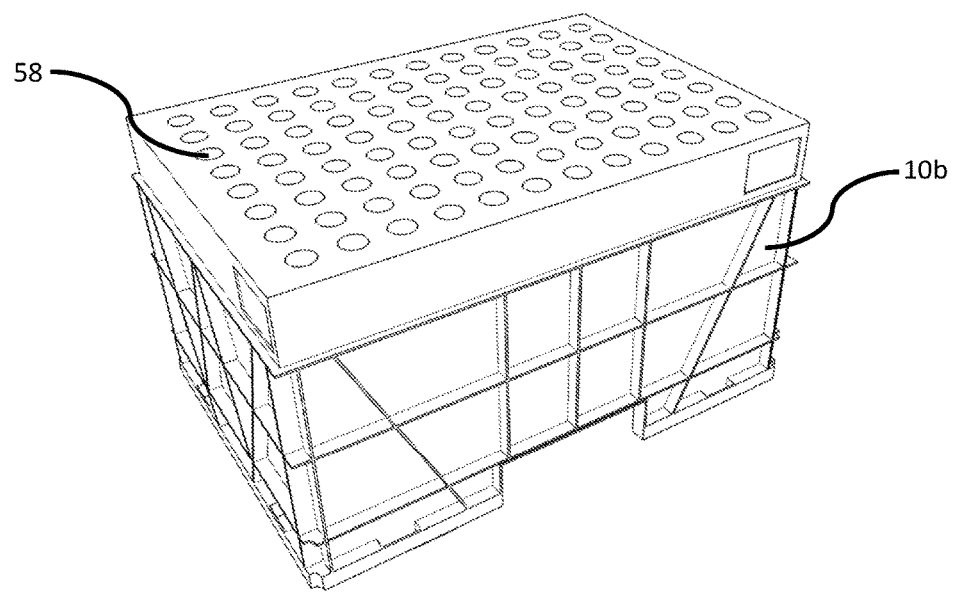

FIG. 6b is a further schematic perspective view of the bin of FIG. 6a, showing the underside of the bin.

As shown in FIGS. 1 and 2, stackable containers, known as bins 10, are stacked on top of one another to form stacks 12. The stacks 12 are arranged in a grid frame structure 14 in a warehousing or manufacturing environment. FIG. 1 is a schematic perspective view of the frame structure 14, and FIG. 2 is a top-down view showing a single stack 12 of bins 10 arranged within the frame structure 14. Each bin 10 typically holds a plurality of product items (not shown), and the product items within a bin 10 may be identical, or may be of different product types depending on the application.

The frame structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, are arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 are lifted clear of the rails 22, and the second set of wheels 36 are lowered into engagement with the second set of rails 22a. The drive mechanism can then be used to drive the second set of wheels 36 to achieve movement in the Y direction.

In this way, one or more robotic load handling devices 30 can move around the top surface of the stacks 12 on the frame structure 14 under the control of a central picking system (not shown). Each robotic load handling device 30 is provided with means for lifting out one or more bins or containers from the stack to access the required products. In this way, multiple products can be accessed from multiple locations in the grid and stacks at any one time.

FIG. 4 shows a typical storage system as described above, the system having a plurality of load handling devices 30 active on the stacks 12.

FIG. 5 shows a bin 10A having an absorbent means 55. Preferably the base of the bin 10A comprises an absorbent means, material or layer 55. More preferably the outer edges of the base of the bin 10A are provided with an absorbent material 55.

Preferably the absorbent material is a sponge more preferably the sponge is a super-absorbing sponge.

One or more bin 10A can be stacked with one or more bin 10 to form a stack 12.

The bins 10A can be manipulated by the load handling device 30 in exactly the same way as bins 10.

The one or more bins 10A are usually located in a remote or storage section of the grid. In the event of a sprinkler deployment or a spillage, liquid will accumulate under some or all of the stacks.

One or more load handling devices removes the storage bins 10 in the stack or stacks 12 in the area of the spillage and relocates them to alternative positions within the system. An available load handling device 30 conveys a bin 10A from the remote or storage section of the grid to the grid location above the spillage of the liquid. The load handling device then lowers the bin 10A to the floor to bring the absorbent means 55 into contact with the wet area of the floor.

Optionally one or more empty or loaded bin 10 may be stacked on top of bin 10A to compress the absorbent material to the floor and thereby effect enhanced liquid uptake especially in the case of spillages of viscous liquids.

Once the absorbent material has been saturated or the floor has been dried adequately the bin 10A and the liquid contained in the absorbent means can be discarded following a single use. This is especially preferred if the bin 10A has been used to remove spillages of perishable, toxic or cleaning materials.

Alternatively the bin 10A may be conveyed by the robotic load handler to a squeezing device.

The squeezing device comprises a vessel for receiving the liquid and a surface against which the absorbent means 55 is compressed by the load handling device 30 to expel liquid from the absorbent means into the vessel.

The bin 10A can then be returned by the load handling device either to the remote or storage section of the grid or to the site of the liquid and the process repeated as often as necessary until the floor is dry.

Preferably the squeezing device is located at the edge of the grid for ease of emptying.

In a second embodiment of the invention the bin 10b is provided with vacuum cleaner means 56. In this embodiment, the bin 10b comprises at least one orifice 58 or opening in the base of the bin 10b, the opening being sealingly connected to vacuum cleaner means 56 such that positioning the opening in the base adjacent a spillage, at the base of the storage system, causes spilt material to be removed and retained in the bin 10b. It will be appreciated that the shape and configuration of the bin 10b may be adapted to aid pick up of solid or liquid spillages. Moreover, the base of the bin 10b may comprise hose means (not shown) to aid the removal of solid or liquid substances.

It will further be appreciated that the bin 10 may comprise vacuum cleaner means 56, or absorbent means 55 or both vacuum cleaner means 56 together with absorbent material means 55.

It will further be appreciated that such bins 10a and 10b or any combination thereof may be deployed in any storage system utilising the system described above with reference to FIGS. 1 to 4 of the figures. For example, should the system be used as a parcel sortation device as disclosed in UK Patent Application No. GB1511130.5, appropriately sized containers or bins 10 may be provided with such absorbent means or vacuum cleaner means.

It will be appreciated that bins or containers comprising additional service means in a storage and retrieval system may require power and or utilities provided to the bin or container. Accordingly, for example only, the vacuum cleaner means may be battery powered. However, should the bin comprising the vacuum cleaner means remain unused in the storage and retrieval system for long periods of time, the battery may discharge. Accordingly, it may be necessary to power the vacuum cleaner directly from the grid or to supply power to the bi to charge the vacuum cleaner contained therein.

Advantageously, the uprights 16 of the framework comprising the storage and retrieval system may be provided with power supply means routed via suitable cables and connectors. The bin 10b may be provided with suitable connecting means to connect the battery of the vacuum cleaner means 56 within the bin 10b to appropriate charging means, whilst it is located within a stack 12 of bins 10 within the storage and retrieval system. UK Patent Application Nos GB1518091.2 and GB1518115.9, hereby incorporated by reference, detail a system and method of routing services and utilities via the uprights of the framework and to bins within the storage and retrieval system.

It will be appreciated that services such as power, may be routed via appropriate cabling throughout the grid structure. The cabling may be routed within the extrusion comprising the framework but may also be retrofitted to existing framework structures. It a similar manner it is possible to route water via pipework mounted on or within the framework structure 16. It will be appreciated that water may be required to assist the removal of spillages via the absorbent means.

In use, water could be supplied to the absorbent means by supplying the bin comprising the absorbent means, whose position is known with water. The water may be sprinkled, dripped or otherwise directed to the absorbent means via suitable computer utility means controlling the position and route of travel of the target absorbent bin 10b.

It will further be appreciated that a plurality of bins 10a and 10b may be located throughout a given storage and retrieval system. In this way the appropriate bin 10a or 10b may be deployed as required.

It will further be appreciated that the bins 10a and 10b described above with reference to the storage and retrieval system may be used in other systems operating in the same manner. For example, UK Patent Application No GB1518094.6 discloses a system of a similar form to the storage and retrieval system described above. However, the system disclosed is used for the propagation of plants, herbs and other living organisms. It will be appreciated that these uses for the system may lead to spillages that require cleaning. In a similar way to that described above, the bins 10a and 10b of the present application may be used in such alternative systems.

It will further be appreciated that one requirement for the bins 10a and 10b is that they are sized so as to be of the same dimensions as the remaining bins and containers in the systems in which they are deployed. Accordingly, it would be possible for relatively large bins or containers to be envisaged. There is no limitation as to the size of the bin that may comprise absorbent means or vacuum cleaner means. Systems such as those disclosed in UK Patent Application No GB1602332.7 and GB1514428.0 disclose storage and retrieval systems for shipping containers and cars accordingly. Containers of such dimensions having absorbent means or vacuum cleaner means may be envisaged.

Furthermore, storage and retrieval systems of the type described above may comprise groups of differently sized bins 10. Accordingly a given system may comprise vacuum cleaner bins 10b or and absorbent bins 10a of different sizes to enable cleaning of spillages of different portions of a given system.

Many variations and modifications not explicitly described above are also possible without departing from the scope of the invention as defined in the appended claims.

The invention claimed is:

1. A storage system comprising:
a first set of parallel rails or tracks and a second set of parallel rails or tracks extending transverse to the first set in a substantially horizontal plane to form a grid pattern having a plurality of grid spaces;
a plurality of storage containers arranged in stacks, located beneath the rails; and
at least one load handling device disposed on the grid, arranged to move laterally above the stacks on the rails, the load handling device having a lifting device arranged to lift at least one storage container from a stack; and at least one cleaning container that includes an absorbent means arranged on at least a portion of an external surface of the cleaning container.

2. The system as claimed in claim 1 wherein the cleaning container can be stacked with storage containers.

3. The system as claimed in claim 1 wherein the cleaning container is conveyed by the load handling device in a same manner as a storage container.

4. The system as claimed in claim 1 wherein the absorbent means comprises:
  an absorbent layer which covers one or more sides of the cleaning container.

5. The system as claimed in claim 1, wherein the absorbent means is located on one or more edges of a base of the cleaning container.

6. The system as claimed in claim 1, wherein the absorbent means is a sponge.

7. The system as claimed in claim 6 wherein the sponge is a super absorbent sponge.

8. The system as claimed in claim 1, wherein the cleaning container is discarded following a single use.

9. The system as claimed in claim 1, wherein the load handling device comprises a squeezing device that includes a vessel for receiving liquid, wherein the squeezing device is configured to compress the absorbent means of the cleaning container to expel liquid from the absorbent means into the vessel.

10. The cleaning container in combination with the storage system according to claim 1, in which the absorbent means comprises:
  absorbent material for absorbing liquid.

11. The cleaning container in combination with the storage system according to claim 1, wherein the cleaning container comprises:
  a vacuum cleaner means.

12. The cleaning container in combination with the storage system according to claim 11, wherein the vacuum cleaner means is powered by a battery in the cleaning container, the battery being rechargeable by power means supplied via the framework of the system.

13. The storage system according to claim 12, wherein the cleaning container includes a releasable connecting means for releasably connecting the battery means to the framework of the system.

14. The system of claim 1, wherein when the cleaning container is located in the lowermost position of the stack of containers, the absorbent means is operable to clean a portion of the base of the storage system.

15. An automated method of removing liquids beneath a robotic picking system of a storage system, the storage system having first and second sets of parallel tracks and a load handling device arranged to move along the first and second sets of parallel tracks, the method comprising:
  conveying a cleaning container by the load handling device to liquid to be removed, the cleaning container including an absorbent means arranged on at least a portion of an external surface of the cleaning container; and
  urging absorbent means against the liquid to draw the liquid into the absorbent means.

16. A storage system comprising:
  a first set of parallel rails or tracks and a second set of parallel rails or tracks extending transverse to the first set in a substantially horizontal plane to form a grid pattern having a plurality of grid spaces;
  a plurality of storage containers arranged in stacks, located beneath the rails; and
  at least one load handling device disposed on the grid, arranged to move laterally above the stacks on the rails, the load handling device having a lifting device arranged to lift a single container from a stack; and
  at least one cleaning container that includes a vacuum cleaning means.

17. The storage system according to claim 16, wherein the cleaning container comprises:
  an absorbent means arranged on at least a portion of an external surface of the cleaning container.

* * * * *